US012572753B2

(12) United States Patent
Depaolo et al.

(10) Patent No.:     US 12,572,753 B2
(45) Date of Patent:     Mar. 10, 2026

(54) GENERATING ALTERNATIVE TEXT ("ALT TEXT") FOR IMAGES

(71) Applicant: INTERNATIONAL BUSINESS MACHINES CORPORATION, Armonk, NY (US)

(72) Inventors: Ann M Depaolo, Lagrangeville, NY (US); Danielle Palumbo, North Babylon, NY (US); David F. Hans, Castleton, NY (US); Debra L. Noll, Poughkeepsie, NY (US); Henry D Gorbsky, Garnerville, NY (US); Kathleen Pfeiffer, Hurley, NY (US); Philip Siconolfi, Massapequa, NY (US)

(73) Assignee: International Business Machines Corporation, Armonk, NY (US)

( * ) Notice: Subject to any disclaimer, the term of this patent is extended or adjusted under 35 U.S.C. 154(b) by 175 days.

(21) Appl. No.: 18/507,339

(22) Filed: Nov. 13, 2023

(65) Prior Publication Data

US 2025/0156650 A1     May 15, 2025

(51) Int. Cl.
| | |
|---|---|
| *G06F 40/40* | (2020.01) |
| *G06V 10/40* | (2022.01) |
| *G06V 10/94* | (2022.01) |
| *G06V 20/50* | (2022.01) |
| *G06V 20/70* | (2022.01) |

(52) U.S. Cl.
CPC .............. *G06F 40/40* (2020.01); *G06V 10/40* (2022.01); *G06V 10/945* (2022.01); *G06V 20/50* (2022.01); *G06V 20/70* (2022.01); *G06V 2201/10* (2022.01)

(58) Field of Classification Search
CPC .......... G06F 40/40; G06F 40/30; G06F 40/56; G06V 10/40; G06V 10/945; G06V 20/50; G06V 20/70; G06V 2201/10
See application file for complete search history.

(56) References Cited

U.S. PATENT DOCUMENTS

| | | | |
|---|---|---|---|
| 10,762,280 B2 | 9/2020 | Bradley et al. | |
| 10,915,572 B2 | 2/2021 | Moraes et al. | |
| 2002/0124020 A1 | 9/2002 | Janakiraman et al. | |
| 2019/0377987 A1* | 12/2019 | Price ...................... | G06N 3/045 |
| 2021/0073617 A1 | 3/2021 | Bazzani et al. | |
| 2021/0279425 A1* | 9/2021 | Horowitz ................ | G06F 40/44 |
| 2023/0237280 A1* | 7/2023 | Beshara ................... | G06F 40/56 704/9 |
| 2023/0281400 A1* | 9/2023 | Wang .................... | G06F 40/284 704/2 |

* cited by examiner

*Primary Examiner* — Qian Yang
(74) *Attorney, Agent, or Firm* — Onyx IP Group

(57) ABSTRACT

Generating alternative text ("alt text") for images, including: performing an image analysis of an image to generate data describing one or more visual attributes of the image; performing a natural language processing on the data to generate a text description of the image; and generating, based on the text description of the image, an alt text for the image.

20 Claims, 6 Drawing Sheets

100

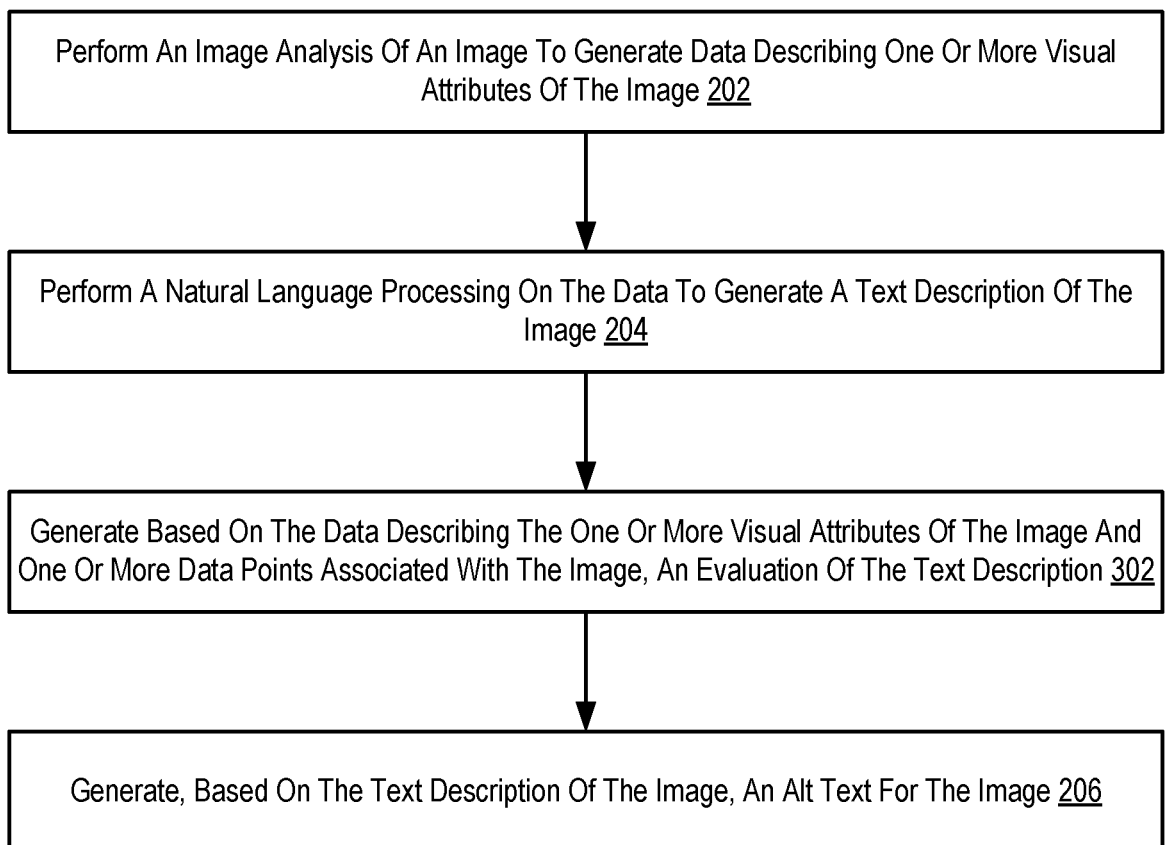

Perform An Image Analysis Of An Image To Generate Data Describing One Or More Visual Attributes Of The Image 202

Perform A Natural Language Processing On The Data To Generate A Text Description Of The Image 204

Generate Based On The Data Describing The One Or More Visual Attributes Of The Image And One Or More Data Points Associated With The Image, An Evaluation Of The Text Description 302

Generate, Based On The Text Description Of The Image, An Alt Text For The Image 206

FIG. 3

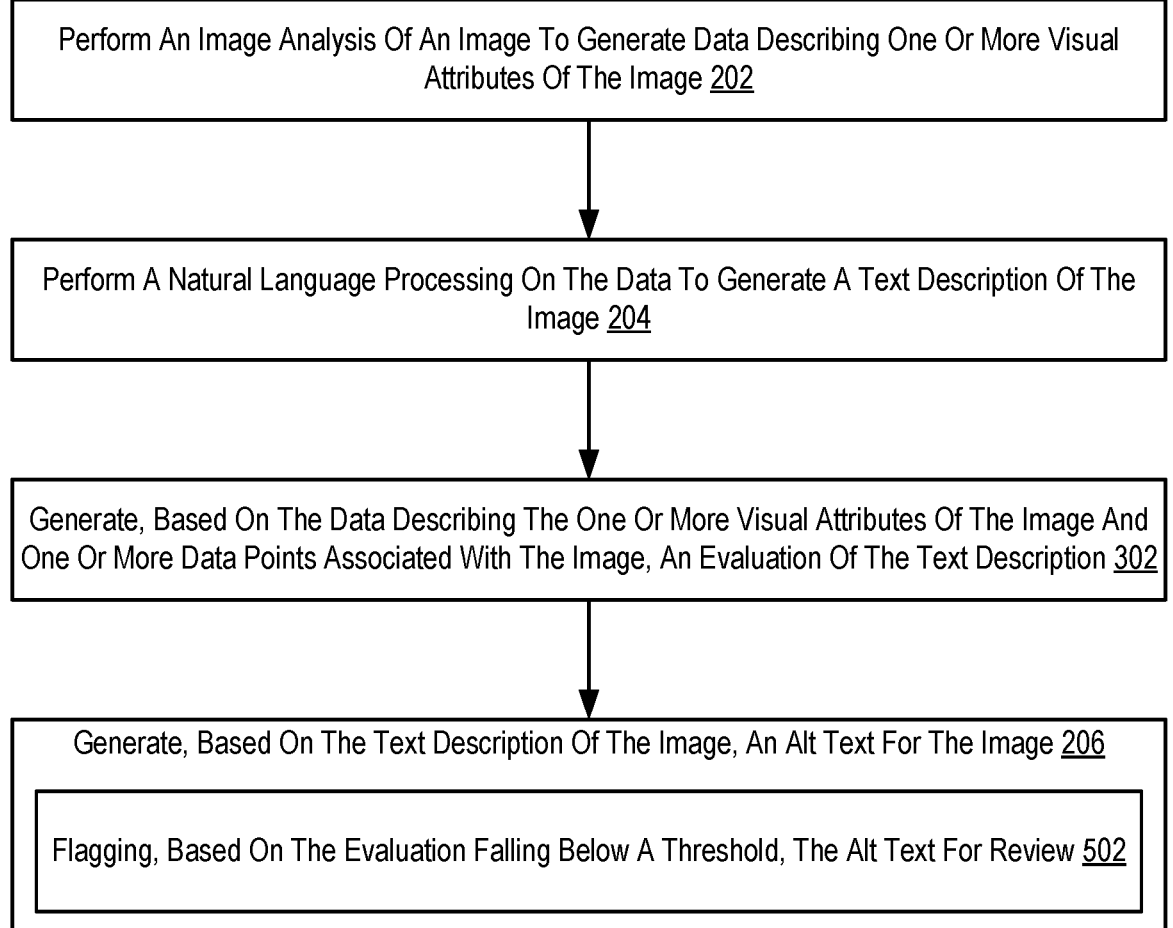

Perform An Image Analysis Of An Image To Generate Data Describing One Or More Visual Attributes Of The Image 202

Perform A Natural Language Processing On The Data To Generate A Text Description Of The Image 204

Generate, Based On The Data Describing The One Or More Visual Attributes Of The Image And One Or More Data Points Associated With The Image, An Evaluation Of The Text Description 302

Generate, Based On The Text Description Of The Image, An Alt Text For The Image 206

Flagging, Based On The Evaluation Falling Below A Threshold, The Alt Text For Review 502

FIG. 5

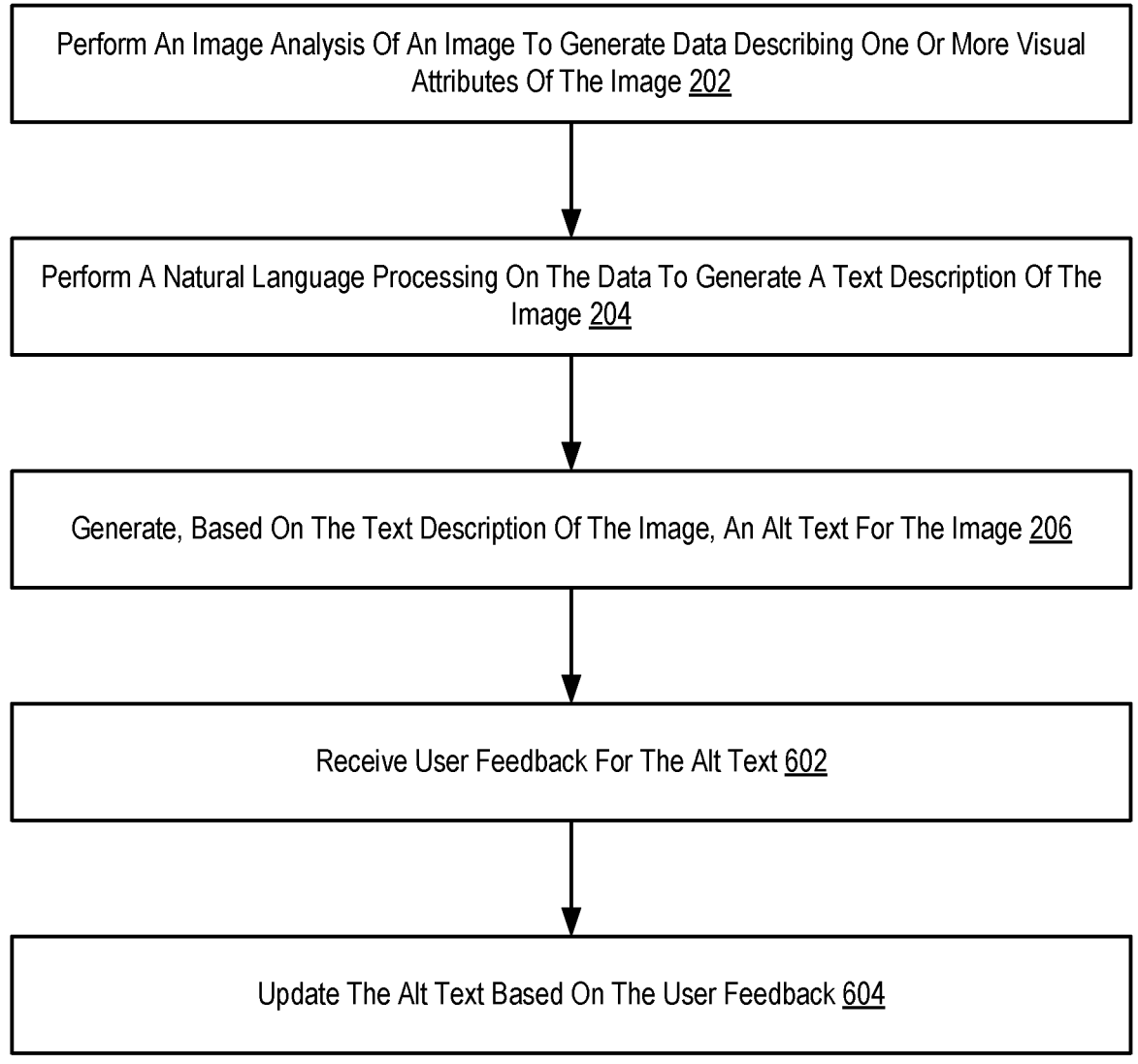

Perform An Image Analysis Of An Image To Generate Data Describing One Or More Visual Attributes Of The Image 202

Perform A Natural Language Processing On The Data To Generate A Text Description Of The Image 204

Generate, Based On The Text Description Of The Image, An Alt Text For The Image 206

Receive User Feedback For The Alt Text 602

Update The Alt Text Based On The User Feedback 604

FIG. 6

GENERATING ALTERNATIVE TEXT ("ALT TEXT") FOR IMAGES

BACKGROUND

The present disclosure relates to methods, apparatus, and products for generating alternative text ("alt text") for images.

SUMMARY

According to embodiments of the present disclosure, various methods, apparatus and products for generating alternative text ("alt text") for images are described herein. In some aspects, generating alternative text ("alt text") for images includes performing an image analysis of an image to generate data describing one or more visual attributes of the image; performing a natural language processing on the data to generate a text description of the image; and generating, based on the text description of the image, an alt text for the image. In some aspects, an apparatus may include a processing device; and memory operatively coupled to the processing device, wherein the memory stores computer program instructions that, when executed, cause the processing device to perform this method. In some aspects, a computer program product comprising a computer readable storage medium may store computer program instructions that, when executed, perform this method.

BRIEF DESCRIPTION OF THE DRAWINGS

FIG. 3 sets forth a flowchart of another example method for generating alternative text ("alt text") for images in accordance with some embodiments of the present disclosure.

FIG. 5 sets forth a flowchart of another example method for generating alternative text ("alt text") for images in accordance with some embodiments of the present disclosure.

FIG. 6 sets forth a flowchart of another example method for generating alternative text ("alt text") for images in accordance with some embodiments of the present disclosure.

DETAILED DESCRIPTION

Alternative text, or "alt text," is included with images to provide accessibility features. For example, alt text may be encoded in a web page in a reference to an image such that text-to-speech or other features may read out or otherwise present the alt text for visually impaired users accessing the web page. Inclusion of alt text for images may be used in evaluating the accessibility of web pages or other content, or to satisfy legal requirements related to accessibility. Although an image may have some alt text included, thereby satisfying the legal or accessibility requirements, this alt text may not be sufficiently descriptive. Insufficiently descriptive alt text may lead to a suboptimal user experience for those users who require or benefit from its inclusion. Accordingly, it may be beneficial to automatically generate alt text that descriptive, contextually relevant, and linguistically accurate to both satisfy accessibility requirements and improve the overall user experience.

Figure 1:
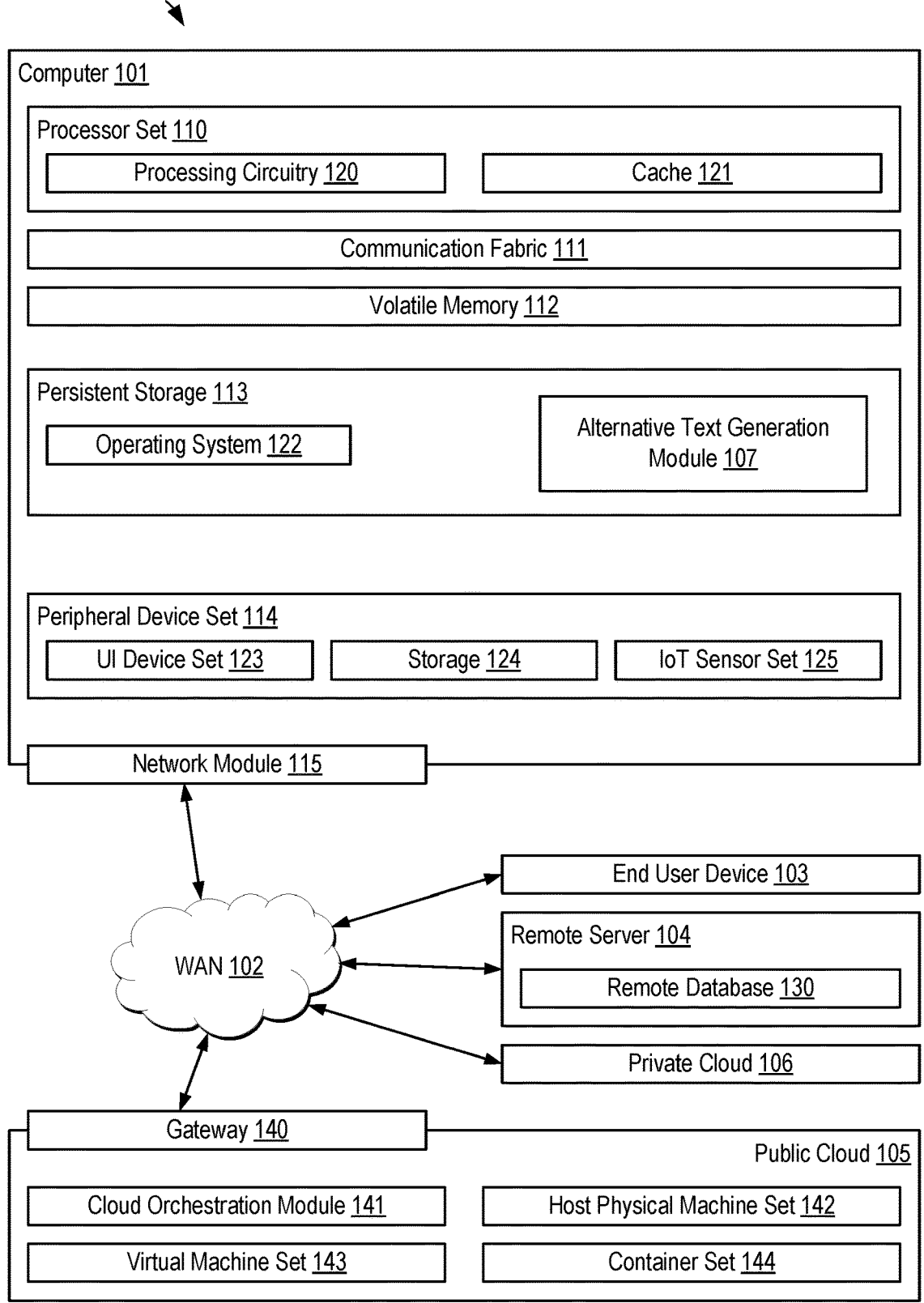
FIG. 1 sets forth a diagram of an example computing environment for generating alternative text ("alt text") for images in accordance with some embodiments of the present disclosure.

With reference now to FIG. 1, shown is an example computing environment according to aspects of the present disclosure. Computing environment 100 contains an example of an environment for the execution of at least some of the computer code involved in performing the various methods described herein, such as the alternative text generation module 107. In addition to block 107, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 107, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document. These computer readable program instructions are stored in various types of computer readable storage media, such as cache 121 and the other storage media discussed below. The program instructions, and associated data, are accessed by processor set 110 to control and direct performance of the computer-implemented methods. In computing environment 100, at least some of the instructions for performing the computer-implemented methods may be stored in block 107 in persistent storage 113.

Communication fabric 111 is the signal conduction path that allows the various components of computer 101 to communicate with each other. Typically, this fabric is made of switches and electrically conductive paths, such as the switches and electrically conductive paths that make up buses, bridges, physical input/output ports and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 107 typically includes at least some of the computer code involved in performing the computer-implemented methods described herein.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database), this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the computer-implemented methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Figure 2:
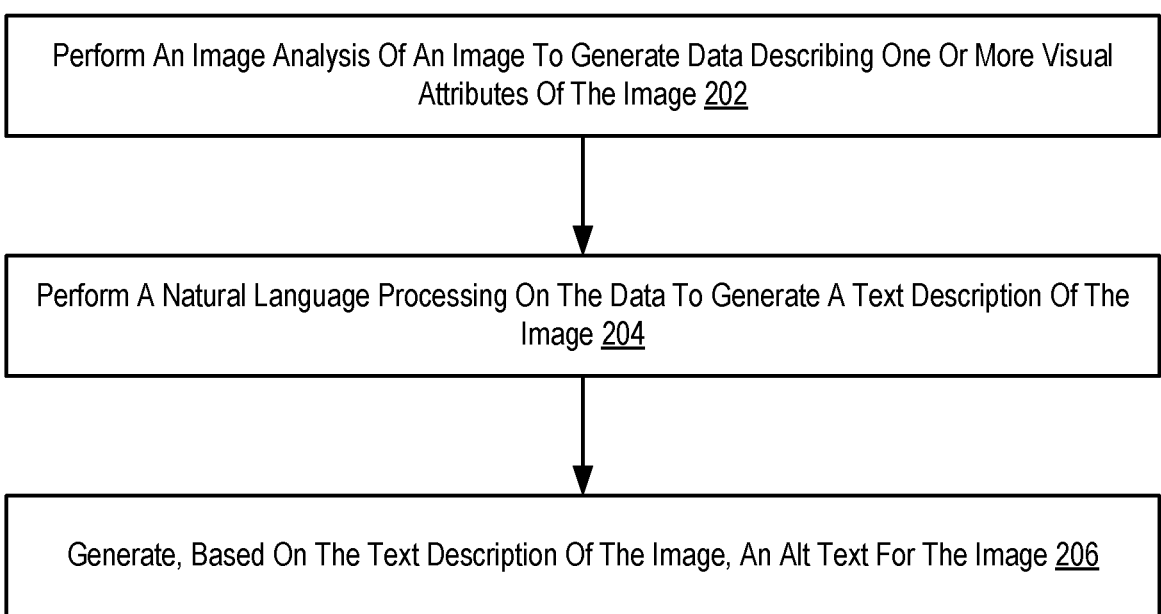
FIG. 2 sets forth a flowchart of an example method for generating alternative text ("alt text") for images in accordance with some embodiments of the present disclosure.

For further explanation, FIG. 2 sets forth a flowchart of an example method of generating alternative text ("alt text") for images in accordance with some embodiments of the present disclosure. The method of FIG. 2 may be performed, for example, by the alternative text generation module 107 of FIG. 1. For example, the alternative text generation module 107 may accept, as input, some portion of content that includes an image for which alt text should be generated. Such content may include web pages, e-books, documents, and the like.

The method of FIG. 2 includes performing 202 an image analysis of an image to generate data describing one or more visual attributes of the image. In some embodiments, performing 202 the image analysis may include, for example, applying one or more machine learning algorithms to the image to generate, as output, the one or more visual attributes of the image. For example, performing 202 the image analysis may include providing the image as input to one or more models that provide, as output, the one or more visual attributes of the image. In some embodiments, performing 202 the image analysis may include applying one or more computer vision, image processing, or other algorithms to the image to generate, as output, the one or more visual attributes. In some embodiments, combinations of multiple approaches or algorithms may be used in performing 202 the image analysis of the image to generate the data describing the one or more visual attributes of the image.

In some embodiments, the one or more visual attributes may include one or more identified objects in the image. In some embodiments, one or more object detection and/or object identification algorithms may be used to classify or label particular objects in an image. For example, assume an image of a man sitting next to a dog in a field. The man and the dog may be identified as objects in the image. Accordingly, the one or more visual attributes may include labels such as "man," "dog," and the like. In some embodiments, the one or more identified objects may be labeled or expressed using more detailed labels describing actions performed by the object (e.g., "running," "sitting," and the like) such that the man may be labeled as "sitting man." In some embodiments, the one or more identified objects may include the background or setting of the image. In the example above, the one or more visual attributes may include "field" or another setting as applicable. In some embodiments, the one or more identified objects may include sub-objects or subcomponents of another identified object. Using the example above, sub-objects or subcomponents of the "man" object may include articles of clothing or accessories worn by the man in the image. In some embodiments, the data describing the one or more identified objects may associate particular objects with their respective sub-objects to facilitate later generation of the alt-text. For example, the data describing the one or more identified objects may indicate a "shirt" object as a sub-object of a "man" object, indicating that the shirt is being worn by the man.

In some embodiments, the one or more visual attributes may include one or more color attributes. The color attributes may describe particular objects identified in the image as described above. Continuing with the example above, assuming that the dog is brown, a color attribute of "brown" may be included in the visual attributes. Where the particular color attribute describes a particular object, the data describing the one or more visual attributes may encode the color attribute with the respective object. For example, the data describing the one or more visual attributes may associate the color attribute with the respective identified object or include the color attribute in the label for the identified object (e.g., "brown dog" continuing with the example above). In some embodiments, the one or more color attributes may describe the image in a non-object-specific manner, such as describing a general hue or color saturation for the image.

In some embodiments, the one or more visual attributes may include a composition of the image. A composition of the image may describe a relative placement of the various objects in the image relative to each other and/or a placement of the objects in the image itself. Continuing with the example above, the composition of the image may indicate that the man is next to the dog, to the right of the dog, and the like. The composition of the image may also indicate where the man and the dog are located in the image (e.g., foreground or background, centered or to the left or right, etc.).

In some embodiments, the one or more visual attributes may include facial expressions, postures, gaze or other descriptions of human objects identified in the image. For example, the one or more visual attributes may indicate whether a man is smiling, frowning, and the like. As another example, the one or more visual attributes may indicate whether a man is looking at the camera, at another object in the image (e.g., a dog using the example above), looking off-camera, and the like. As a further example, the one or more visual attributes may indicate whether a person is sitting, standing, lying down, hunched over, and the like as related to their body posture.

One skilled in the art will appreciate that the visual attributes described above are merely exemplary and that other visual attributes are also contemplated within the scope of the present disclosure that may be used in combination with or instead of any of the visual attributes described above. Particularly, the one or more visual attributes that are described using the performed 202 image analysis go beyond simple object recognition, but include attributes that relate to the content, context, and visual elements of the image.

The method of FIG. 2 also includes performing 204 a natural language processing on the data (e.g., the data describing one or more visual attributes of the image) to generate a text description of the image. The text description of the image is a natural language expression describing the image. Accordingly, performing 204 the natural language processing on the data includes generating, based on the visual attributes described by the data, the text description of the image.

In some embodiments, performing 204 the natural language processing on the data to generate the text description of the image may also include performing the natural language processing on one or more contextual attributes associated with the image. In other words, the text description of the image may be generated based on a combination of the data describing the one or more visual attributes of the image as well as the one or more contextual attributes. The one or more contextual attributes describe the content in which the image is included (e.g., the web page, document, and the like in which the image is included). In some embodiments, the one or more contextual attributes may include surrounding content relative to the image (e.g., occurring before or after the image). For example, where the image is included in a web page or document, the surrounding content may include text that occurs before or after the image, other images occurring before or after the image, alt text for other images occurring before or after the image, and the like.

In some embodiments, the one or more contextual attributes include one or more attributes describing an intent associated with the image. The intent associated with the image describes a purpose for the image in the content. In some embodiments, the intent associated with the image may be derived from the surrounding content or the content as a whole. For example, where the image is a flowchart, the surrounding content may be analyzed (e.g., using natural language analysis, machine learning, and the like) to determine the purpose or intent of the flowchart as presented to a user. In some embodiments, the one or more contextual attributes may include one or more user interactions with the content that includes the image. Such user interactions may include user contributions to the content, such as comments. Such user interactions may also include tags submitted by users for the content and/or the image.

Using these various data points, the test description of the image may be generated according to a variety of approaches. For example, in some embodiments, these data points may be provided as input to one or more models, such as a large language model (LLM) or generative artificial intelligence (AI) model configured to provide a natural language output (e.g., the text description). For example, these data points may be included in a prompt provided to a LLM or generative AI model soliciting, as output, a text description for the image.

The method of FIG. 2 also includes generating 206, based on the text description of the image, an alt text for the image. In some embodiments, the text description may be used as the alt text for the image. In some embodiments, as will be described in further detail below, the text description may be evaluated and, based on the evaluation, the text description may be updated or modified before being used as the alt text for the image. In some embodiments, generating 206 the alt text for the image includes encoding the alt text for the image in the content including the image. In some embodiments, generating 206 the alt text for the image includes storing data indicating the alt text for the image that may be later accessed or referenced in order to incorporate the alt text for the image into the content.

For further explanation, FIG. 3 sets forth a flowchart of an example method of generating alternative text ("alt text") for images in accordance with some embodiments of the present disclosure. The method of FIG. 3 is similar to FIG. 2 in that the method of FIG. 3 also includes: performing 202 an image analysis of an image to generate data describing one or more visual attributes of the image; performing 204 a natural language processing on the data to generate a text description of the image; and generating 206, based on the text description of the image, an alt text for the image.

The method of FIG. 3 differs from FIG. 2 in that the method of FIG. 3 also includes generating 302, based on the data describing the one or more visual attributes of the image and one or more data points associated with the image, an evaluation of the text description. The evaluation of the text description is a qualitative evaluation of how well the text description serves to describe the image. Particularly, the evaluation reflects a multi-modal assessment of the text description based on data used to generate the text description as well as other data points to be described in further detail below. The evaluation of the text description may include a quantitative evaluation such as a score, a label or descriptive evaluation (e.g., "good," "bad," "very good," "very bad," and the like), or another evaluation as can be appreciated.

In some embodiments, the one or more data points may include the one or more contextual attributes described above that may be used in generating the text description. In some embodiments, the one or more data points may include metadata associated with the image. Such metadata may describe the image itself, the content in which the image is included, other images included in the content, and the like. In some embodiments, the one or more data points may include user feedback for the text description, described in further detail below, user feedback for other alt text or text descriptions, and the like.

In some embodiments, generating 302 the evaluation of the text description may include applying one or more rules to the text description, the data describing the one or more visual attributes of the image, and the one or more data points. In some embodiments, generating 302 the evaluation of the text description may include providing, as input to one or more models configured to provide the evaluation as output, the text description, the data describing the one or more visual attributes of the image, and the one or more data points.

As an example, in some embodiments, a text description may be assigned a higher evaluation where terms used to describe the visual attributes of the image are included in the text description or are similar to terms used in the text description. Conversely, a text description may be assigned a lower evaluation where some terms used to describe the visual attributes of the image are not included in the text description or may be contradicted by the text description. As another example, a text description may be assigned a higher evaluation where metadata tags are included in the text description or are similar to terms used in the text description. Conversely, a text description may be assigned a lower evaluation where metadata tags are not included in the text description or may be contradicted by the text description. As a further example, a text description receiving positive user feedback may be assigned a higher evaluation while a text description receiving negative or a split between positive and negative feedback may be assigned a lower evaluation. One skilled in the art will appreciate that these examples are merely illustrative and that an evaluation for a text description may be generated 302 according to other approaches.

Figure 4:
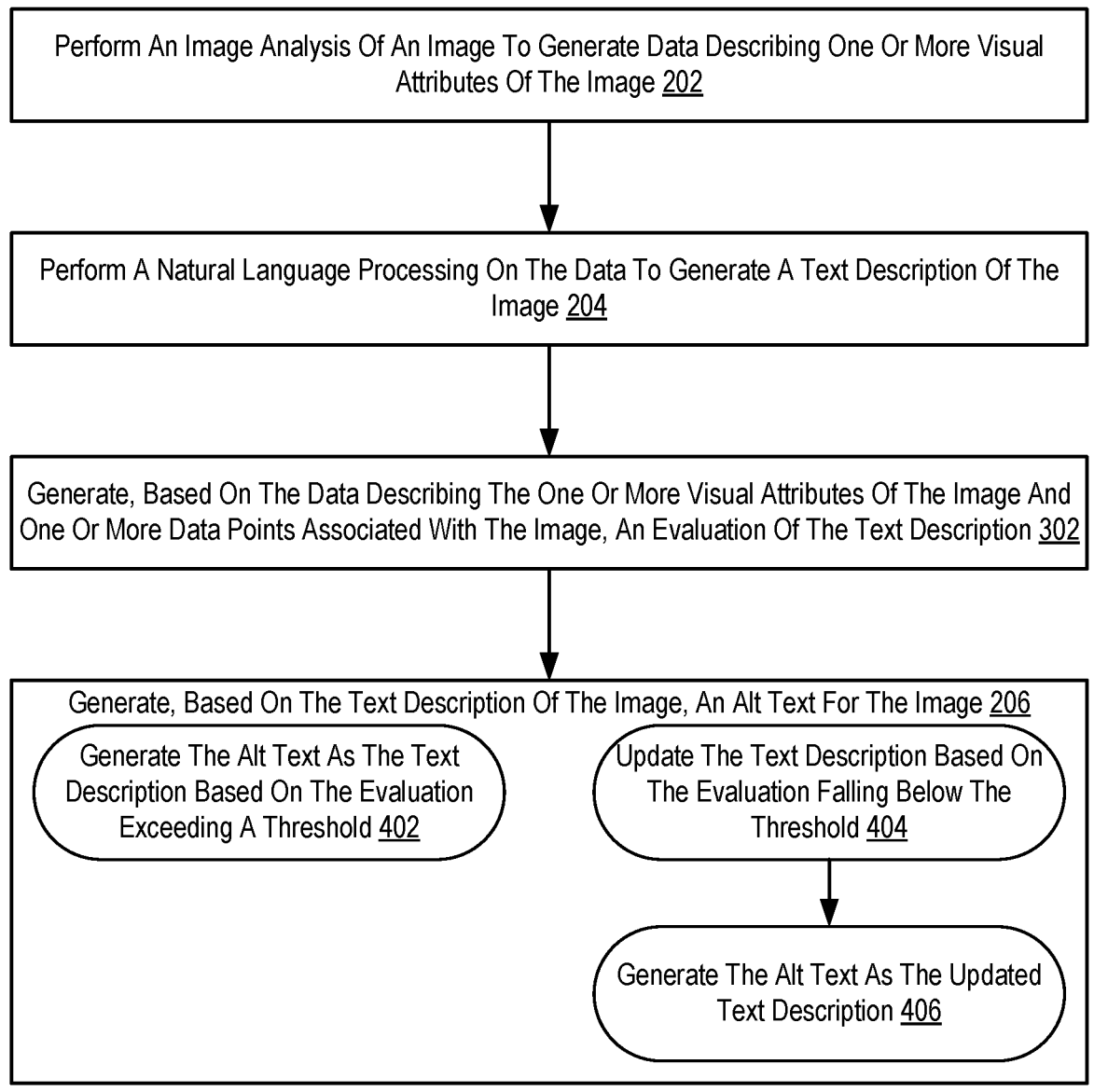
FIG. 4 sets forth a flowchart of another example method for generating alternative text ("alt text") for images in accordance with some embodiments of the present disclosure.

For further explanation, FIG. 4 sets forth a flowchart of an example method of generating alternative text ("alt text") for images in accordance with some embodiments of the present disclosure. The method of FIG. 4 is similar to FIG. 3 in that the method of FIG. 4 also includes: performing 202 an image analysis of an image to generate data describing one or more visual attributes of the image; performing 204 a natural language processing on the data to generate a text description of the image; generating 302, based on the data describing the one or more visual attributes of the image and one or more data points associated with the image, an evaluation of the text description; and generating 206, based on the text description of the image, an alt text for the image.

The method of FIG. 4 differs from FIG. 3 in that generating 206, based on the text description of the image, an alt text for the image also includes generating 402 the alt text as the text description based on the evaluation exceeding a threshold. For example, where the evaluation meets some numerical threshold or is assigned a label of a particular level or greater (e.g., "good"), the text description may be used as the alt text for the image. Where the evaluation falls below a threshold, generating 206, based on the text description of the image, an alt text for the image also includes updating 404 the text description based on the evaluation falling below the threshold. For example, particular terms in the text description may be removed or modified. As another example, the text description may be regenerated using different hyperparameters, activation thresholds, weights, and the like. In some embodiments, updating 404 the text description may be repeatedly performed until an evaluation for the updated text description meets some threshold or other criteria are satisfied (e.g., a maximum number of iterations have been performed). In some embodiments, updating 404 the text description may cause the updated text description to be flagged for review prior to approval for use as the alt text. Accordingly, generating 206, based on the text description of the image, an alt text for the image also includes generating 406 the alt text as the updated text description.

For further explanation, FIG. 5 sets forth a flowchart of an example method of generating alternative text ("alt text") for images in accordance with some embodiments of the present disclosure. The method of FIG. 5 is similar to FIG. 3 in that the method of FIG. 5 also includes: performing 202 an image analysis of an image to generate data describing one or more visual attributes of the image; performing 204 a natural language processing on the data to generate a text description of the image; generating 302, based on the data describing the one or more visual attributes of the image and one or more data points associated with the image, an evaluation of the text description; and generating 206, based on the text description of the image, an alt text for the image.

The method of FIG. 5 differs from FIG. 3 in that generating 206, based on the text description of the image, an alt text for the image also includes flagging 502, based on the evaluation falling below a threshold, the alt text for review. In some embodiments, flagging 502 the alt text for review includes generating data, such as a metadata tag or other data, indicating that the alt text should be manually reviewed and/or modified. In some embodiments, flagging 502 the alt text for review includes sending a notification to one or more users indicating that the alt text should be reviewed.

In embodiments where the text description is used as the alt text responsive to the evaluation meeting a threshold and updated responsive to the evaluation falling below a threshold, a second threshold may be used to determine whether the alt text should be flagged 502 for review. For example, where the evaluation meets a first threshold but falls below a second threshold higher than the first, the text description may be used as the alt text but is flagged 502 for review. Where the evaluation meets the first and second threshold the text description may be used as the alt text without being flagged 502 for review.

For further explanation, FIG. 6 sets forth a flowchart of an example method of generating alternative text ("alt text") for images in accordance with some embodiments of the present disclosure. The method of FIG. 6 is similar to FIG. 2 in that the method of FIG. 6 also includes: performing 202 an image analysis of an image to generate data describing one or more visual attributes of the image; performing 204 a natural language processing on the data to generate a text description of the image; and generating 206, based on the text description of the image, an alt text for the image.

The method of FIG. 6 differs from FIG. 2 in that the method of FIG. 6 also includes receiving 602 for the alt text. As an example, a web page or other content including the image and the alt text may include mechanisms for user input reflecting feedback for the alt text (e.g., thumbs up and thumbs down icons, up arrows and down arrows, and the like). As another example, a web page or other content including the image may include mechanisms for users to tag images with tags describing the alt text (e.g., "helpful," "unhelpful," "accurate," "inaccurate," and the like). Other approaches for receiving 602 user feedback are also contemplated within the scope of the present disclosure.

The method of FIG. 6 also includes updating 604 the alt text based on the user feedback. For example, in some embodiments, updating 604 the alt text based on the user feedback includes flagging the alt text for review responsive to some amount of negative and/or neutral feedback exceeding a threshold. As another example, in some embodiments, the received user feedback may be provided as training data used to retrain one or more models used to generate the alt text. The alt text may then be regenerated using the retrained models. As a further example, in some embodiments, the received user feedback may be provided as input to the one or more models used to generate an evaluation of the alt text as described above, which may cause the alt text to be updated 604.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:

performing an image analysis of an image on a web page to generate data describing one or more visual attributes of the image, wherein performing the image analysis comprises applying one or more of computer vision or image processing to the image to generate, as an output, the one or more visual attributes of the image;

performing a natural language processing on the data to generate a text description of the image, wherein performing the natural language processing on the data comprises providing the data to one or more machine learning models and obtaining the text description of the image as an output from the one or more machine learning models;

generating, based on the text description of the image, an alt text for the image, wherein generating the alt text comprises:

generating, based on the data describing the one or more visual attributes of the image and one or more data points associated with the image, an evaluation of the text description, generating the alt text as the text description based on the evaluation exceeding a threshold, and updating the text description based on the evaluation falling below the threshold; and causing the alt text to be presented with the image via the web page.

2. The method of claim 1, wherein generating the evaluation comprises generating, based on the data describing the one or more visual attributes of the image and metadata associated with the image, the evaluation of the text description.

3. The method of claim 2, wherein the threshold is a first threshold, and wherein generating the alt text for the image comprises generating, based on the evaluation of the text description meeting the first threshold and a second threshold, the alt text as the text description of the image.

4. The method of claim 2, wherein updating, based on the evaluation of the text description falling below the threshold comprises:

regenerating the text description using different hyperparameters, activation thresholds, weights; and generating, as the alt text, the regenerated text description.

5. The method of claim 2, further comprising flagging, based on the evaluation of the text description falling below a threshold, the alt text for review.

6. The method of claim 2, wherein the one or more data points comprises metadata associated with the image.

7. The method of claim 2, wherein the one or more data points comprises user feedback associated with the image.

8. The method of claim 1, further comprising:

receiving user feedback for the alt text; and updating the alt text based on the user feedback.

9. The method of claim 1, wherein the text description of the image is further generated based on one or more contextual attributes associated with the image.

10. The method of claim 1, wherein the one or more visual attributes comprises at least one of:

one or more identified objects, an image composition, or one or more facial expressions.

11. An apparatus comprising:

a processing device; and memory operatively coupled to the processing device, wherein the memory stores computer program instructions that, when executed, cause the processing device to:

perform an image analysis of an image on a web page to generate data describing one or more visual attributes of the image, wherein the computer program instructions, when executed to perform the image analysis, further cause the processing device to apply one or more of computer vision or image processing to the image to generate, as an output, the one or more visual attributes of the image;

perform a natural language processing on the data to generate a text description of the image, wherein the computer program instructions, when executed to perform the natural language processing on the data, further cause the processing device to provide the data to one or more machine learning models and obtain the text description of the image as an output from the one or more machine learning models;

generate, based on the text description of the image, an alt text for the image, wherein the computer program instructions, when executed to generate the alt text for the image, further cause the processing device to:

generate, based on the data describing the one or more visual attributes of the image and one or more data points associated with the image, an evaluation of the text description, generate the alt text as the text description based on the evaluation exceeding a threshold, and update the text description based on the evaluation falling below the threshold;

present the image via the web page; and cause the alt text to be read out when the image is provided via the web page.

12. The apparatus of claim 11, wherein the computer program instructions, when executed, further cause the processing device to generate, based on the data describing the one or more visual attributes of the image and metadata associated with the image, the evaluation of the text description.

13. The apparatus of claim 11, wherein the threshold is a first threshold, and wherein the computer program instructions, when executed to generate the alt text for the image further cause the processing device to generate, based on the evaluation of the text description meeting the first threshold and a second threshold, the alt text as the text description of the image.

14. The apparatus of claim 11, wherein the computer program instructions, when executed to generate the alt text for the image comprises: regenerate the text description using different hyperparameters, activation thresholds, weights; and generate, as the alt text, the regenerated text description.

15. The apparatus of claim 11, wherein the computer program instructions, when executed, further cause the processing device to flag, based on the evaluation of the text description falling below a threshold, the alt text for review.

16. The apparatus of claim 11, wherein the one or more data points comprises metadata associated with the image.

17. The apparatus of claim 11, wherein the one or more data points comprises metadata associated with the image.

18. The apparatus of claim 11, wherein the computer program instructions, when executed, further cause the processing device to:

receive user feedback for the alt text; and update the alt text based on the user feedback.

19. The apparatus of claim 11, wherein the text description of the image is further generated based on one or more contextual attributes associated with the image.

20. A computer program product comprising a computer readable storage medium, wherein the computer readable storage medium comprises computer program instructions that, when executed, cause a processing device to:

perform an image analysis of an image on a web page to generate data describing one or more visual attributes of the image, wherein the computer program instructions, when executed to perform the image analysis, further cause the processing device to apply one or more of computer vision or image processing to the image to generate, as an output, the one or more visual attributes of the image;

perform a natural language processing on the data to generate a text description of the image, wherein the computer program instructions, when executed to perform the natural language processing on the data, further cause the processing device to provide the data to one or more machine learning models and obtain the text description of the image as an output from the one or more machine learning models;

generate, based on the text description of the image, an alt text for the image, wherein he computer program instructions, when executed to generate the alt text for the image, further cause the processing device to:

generate, based on the data describing the one or more visual attributes of the image and one or more data points associated with the image, an evaluation of the text description, generate the alt text as the text description based on the evaluation exceeding a threshold, and update the text description based on the evaluation falling below the threshold; and cause the alt text to be presented with the image via the web page.

* * * * *